Sept. 4, 1951 R. F. HALLOCK 2,566,327
DEHUMIDIFIER SYSTEM
Filed Feb. 5, 1946 4 Sheets-Sheet 1
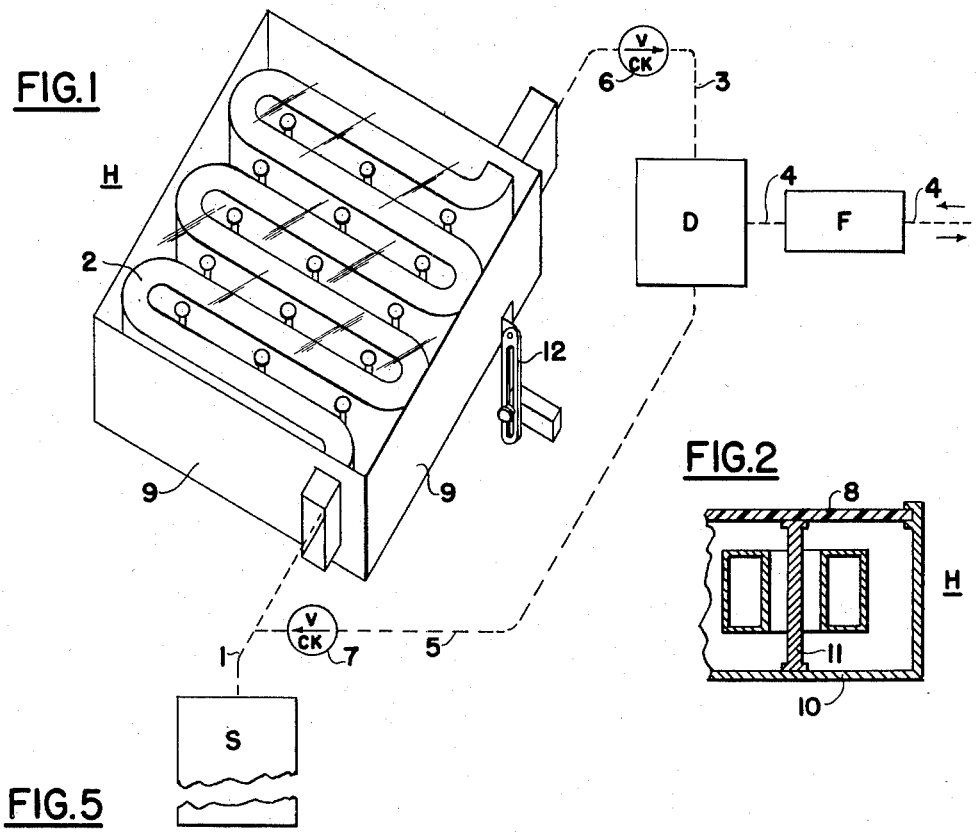
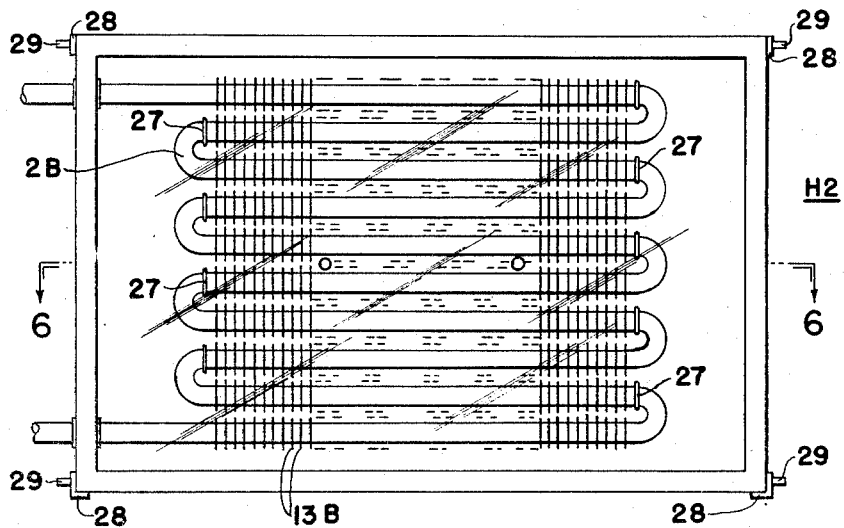
INVENTOR.
ROBERT F. HALLOCK
BY
*M. Hayes*
ATTORNEY

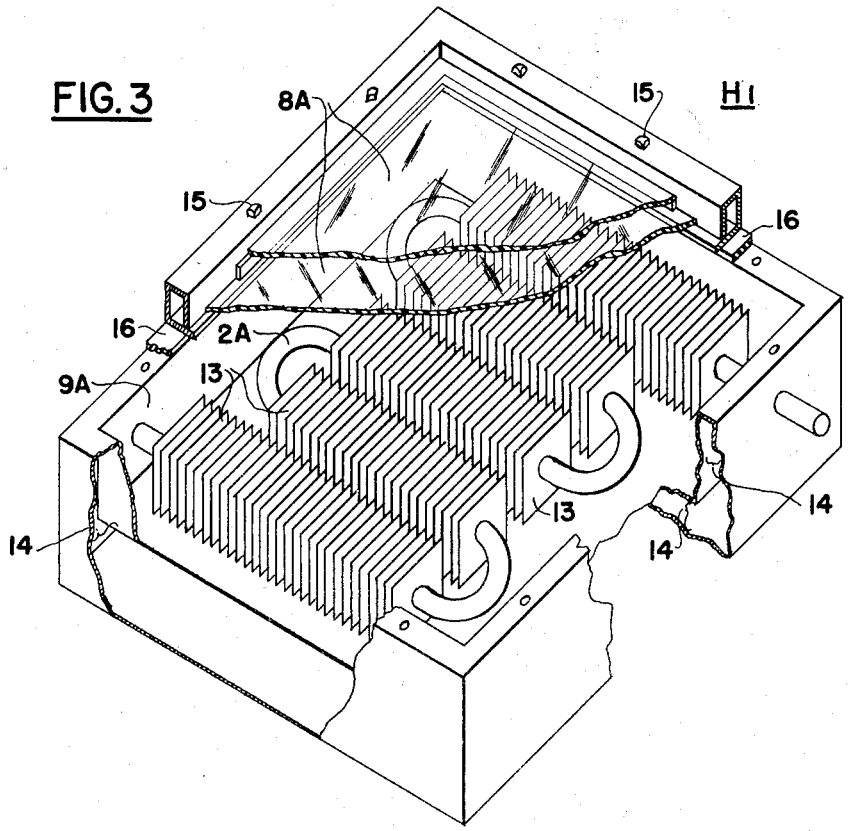
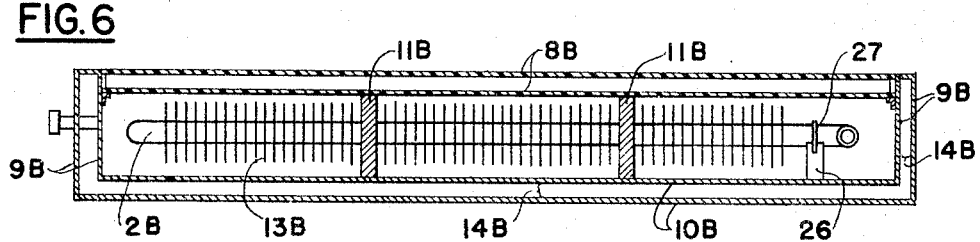

Sept. 4, 1951  R. F. HALLOCK  2,566,327
DEHUMIDIFIER SYSTEM

Filed Feb. 5, 1946  4 Sheets-Sheet 4

INVENTOR.
ROBERT F. HALLOCK
BY

ATTORNEY

Patented Sept. 4, 1951

2,566,327

UNITED STATES PATENT OFFICE 2,566,327

DEHUMIDIFIER SYSTEM

Robert F. Hallock, Hillside, Md.

Application February 5, 1946, Serial No. 645,686

2 Claims. (Cl. 34—80)

(Granted under the act of March 3, 1883, as amended April 30, 1928; 370 O. G. 757)

My invention relates to systems which employ desiccants to control the humidity of atmospheres within confined spaces such, for example, as storage vaults, chambers, or other containers whose primary or auxiliary purpose is prolonged or temporary storage of materials or objects including tools, grain, machinery, electrical equipment or the like.

In accordance with my invention, the system includes a solar-heat trap which provides for automatic reactivation of the desiccant during breathing cycles of the system incident to natural variations in the ambient atmospheric conditions thus to provide a desired relative humidity of the atmosphere within the confined space: preferably the incoming air is filtered to remove physical and chemical impurities such as dust and corrosive gases and vapors.

My invention further resides in systems and components having features of construction and arrangement hereinafter described.

For an understanding of my invention and for illustration of various modifications thereof, reference is made to the accompanying drawings in which:

Figure 1 schematically illustrates a dehumidifying system.

Figure 2 on enlarged scale and in section shows details of construction of the solar-heat trap included in Figure 1.

Figure 3 is an isometric view, with parts broken away, of another form of solar-heat trap.

Figure 5 is a plan view of another form of solar-heat trap.

Figure 6 is a sectional view taken on line 6—6 of Figure 5.

Figure 4:
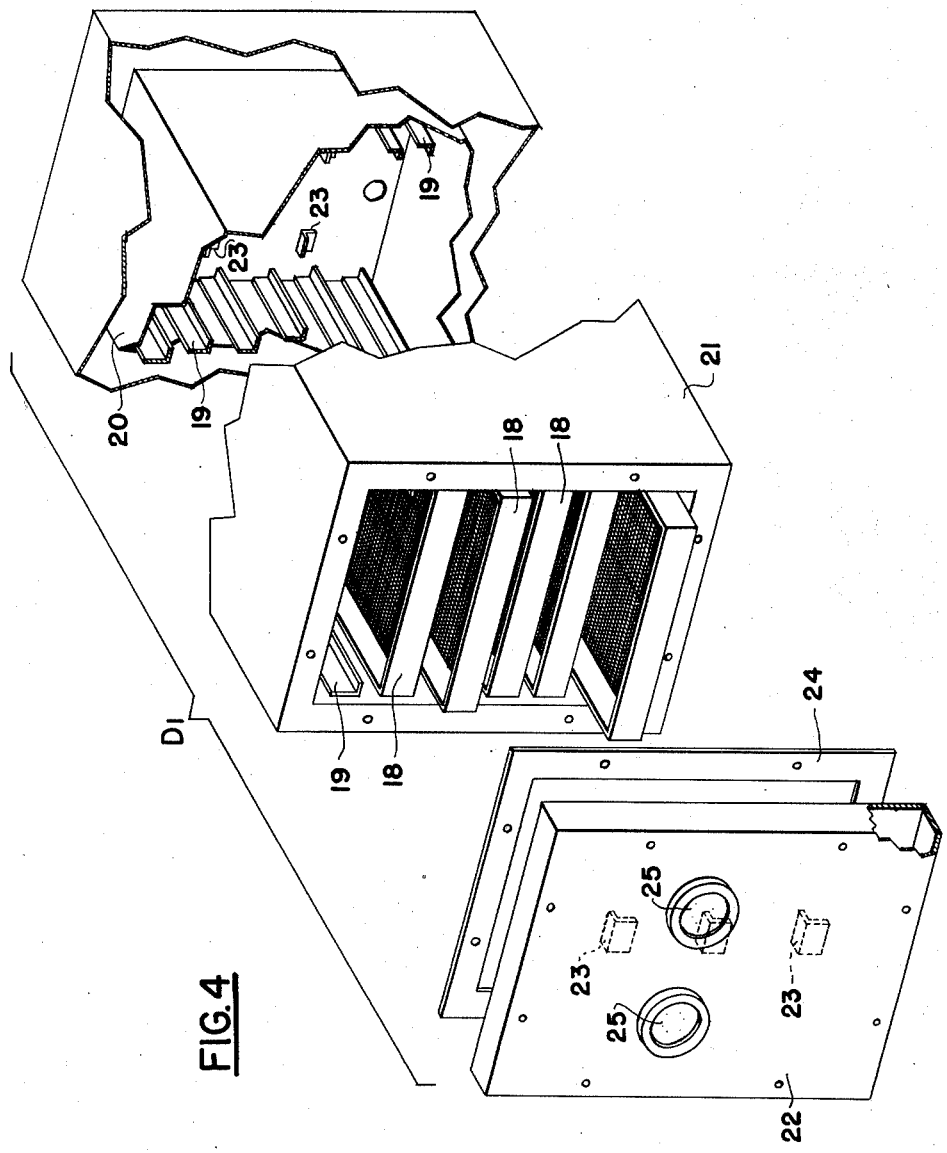
Figure 4 is an exploded isometric view with parts broken away of a desiccant container.

Referring to Figure 1, the chamber S exemplifies a structure providing a compartment or space in which, for example, materials or equipment may be disposed or stored to meet future needs or demands or during shipment. The structure is sealed so that the atmosphere therein is substantially confined or isolated from the external atmosphere except for the air line 1 through which the structure, as hereinafter appears, breathes in response to change in ambient atmospheric conditions.

The air-line 1 is connected to one end of heater tubing 2, within the solar-heat trap H, whose other end is connected to air-line 3 which extends to the desiccant container D having an exhaust air-line 4 open to external atmosphere and preferably including a filter F. The air line 1 is also connected directly to the desiccant container or dehumidifier D by air-line 5. The check-valves 6 and 7 in the lines 3 and 5 respectively permit flow only in the directions indicated in the drawing.

The top 8 of heater H is transparent to permit passage of radiation from the sun: preferably it is of Lucite or analogous material which freely transmits infra-red and ultra-violet radiation in addition to visible radiation whereas glass is substantially opaque to infra-red and ultra-violet. The top, however, may be of glass.

The interior faces of the bottom and side walls of heater H are painted or coated, if necessary, to reflect incident radiation back onto the heater coil or tubing 2, preferably copper, which is painted dull black to ensure maximum heat absorption. The side and bottom walls 9 and 10 may, for example, be of steel and the interior faces covered with aluminum paint to obtain the desired high reflectivity.

Preferably the solar-heater H is an air-tight structure from which the air has been to greater or lesser extent exhausted to decrease heat losses. The braces or struts 11 may be provided to resist collapse of the housing by the external atmospheric pressure.

In installation of the heater H, it should be disposed on or adjacent the storage structure S for exposure to the sun and at such angle, considering the latitude, that the plane of the coil 2 is as near as possible normal to the incident radiation from the sun, and with the coil turns extending in east-west direction. For convenience in setting or resetting the heater position, an angular scale 12 may be provided.

The air lines, particularly if long, may be covered with suitable heat-insulation material.

The desiccant container is preferably shielded from the sun and may be painted dull black to maintain as nearly as possible a constant elevated temperature. If exposed to the sun, the temperature variation between night and day may be sufficient to create an undesirable temperature differential which in turn will tend to break down the desiccant if exposed, the exterior may be painted white or aluminum to reflect radiation and so prevent undue heating.

The density of the atmosphere within the compartment S varies in response to changes in temperature and pressure of the ambient external atmosphere; the varying density produces within the compartment a variable pressure independent of atmospheric pressure when valves 6 and 7 are both closed but directly proportional to the absolute temperature. As the system is vented to external atmosphere, the compartment S breathes, expelling air through the vent line 4 when the pressure within the compartment is super-atmospheric, as during hours of sunshine, and inhaling air when that pressure is sub-atmospheric as during intervening hours of darkness.

Air flowing to the compartment from the external atmosphere passes through the container D, the desiccant therein removing substantially all of the moisture from the air before it reaches the storage compartment S. Air flowing from the compartment to external atmosphere first passes through the solar heater, in which its temperature is substantially raised, for example, to 180° F. in winter or 250° F. in summer, and thence through the desiccant container D to the vent line 4. The heated air in passing through container D reactivates the desiccant so that once the system is installed it operates for an indefinitely long period without attention such as replacement of desiccant.

Since an average day provides a temperature differential of from about 20 to 40 degrees Fahrenheit, the volume of air flowing to and from container S may be in a specific case, approximately 10 per cent of the total volume. By selection of size of solar heater and of capacity of the desiccant container relative to the volume of enclosure S, any desired equilibrium relative humidity may be approximately maintained.

The check valves 6 and 7 are needed only when the displacement of the system is less than about 100 cubic feet of air. The check valve 6 is to prevent incoming air from passing through the solar heater H so as to avoid elevation of its temperature above that of the atmosphere within container S. The check valve 7 is to prevent the outgoing air from passing directly to the dehumidifier D and to ensure that it first passes through the heat trap H for elevation of its temperature for reactivation of the desiccant.

When the volumetric air content of compartment S is above about 100 cubic feet, the system may be simplified to include only the air-line 1, solar heater H, air line 3, dehumidifier D and vent line 4, preferably with filter F therein. Such modification, in which the check valves 6 and 7 and return air-line 5 is omitted, has been found feasible with larger systems.

At first glance it would appear that as air passes from the solar heater H to the dehumidifier, when the temperature and pressure increases, that a back pressure would be set up in the heater tending to neutralize air flow from compartment S but tests have revealed that sufficient pressure is obtained from compartment S to force air through line 1, the heater H, the dehumidifier D and the exhaust vent 4. The cross-sectional area of the heater tubing is greater than that of air-line 1 so that the velocity of air entering the heater from compartment S is reduced to afford longer time for it to absorb heat and so to increase its effectiveness in reactivation of desiccant.

From tests on a wide variety of materials including samples of rubber, plastics, rope, leather, wool, wood, numerous metals, as well as electrical equipment, engines, storage batteries, clothing and other items, it appears that with a relative humidity of not above about 30 per cent no visible deterioration occurs for long protracted periods of time and that none occurs even though the relative humidity for some periods of time may be as high as 45 per cent. At 65 per cent relative humidity some items show pitting and rusting and at 90 per cent relative humidity, even in dust-free atmospheres, deterioration is evident in a short period.

Iron and steel normally rust when exposed, the rate of attack depending on several variable conditions, the most important of which are relative humidity and impurities such as dust particles, salt and sulphur compounds in the atmosphere. When the relative humidity is such that the dew point is reached, a film of moisture collects on the metal and the corrosion rate becomes excessive. In dry air, ferrous metals last indefinitely: in pure air, corrosion begins to be marked if the relative humidity exceeds a magnitude within the critical range of about 43 per cent to 68 per cent. The presence of hygroscopic salts, such as magnesium chloride, in the pores of the metallic surface may, however, cause corrosion at humidities substantially below that critical range.

For some materials, for example explosives, the relative humidity should not be permitted to become too low. This can be prevented by use of manually or automatically controlled valves to by-pass or exclude the solar-heater: however, by judicious selection of size and type of heater H and dehumidifier D, the relative humidity may be maintained within desired safe limits.

The filter F for purifying incoming air is of a type which removes both physical and chemical impurities. For example, it may comprise fibreglass and finely drawn strands of copper. The fibreglass filters out such foreign matter as dust particles, rain, and insects whereas the copper extracts hydrogen sulphide, an extremely corrosive agent common in industrial or thickly-populated areas. In addition, a weather screen may be provided to prevent rain or snow from clogging the filter pores.

In the form of solar-heat trap H1 shown in Figure 3, the tubing comprising the heater coil 2A is of circular cross-section and is provided with fins 13 for enhanced absorption of heat. The tubing and fins may be of copper, or other suitable material of high heat-conductivity, painted dull black. As in heater H which heater H1 may replace in the system of Figure 1, the inner surfaces of the bottom and side walls may be coated, as with aluminum or white paint, to reflect back against the coil or fins radiation which in entering the heater did not impinge upon them.

To reduce the heat losses, the heater H1 is of double-wall construction having between the walls a dead-air space 14 which may if desired contain heat-insulating material such as fibreglass to inhibit thermal air currents.

The top wall 8A of the heater, which may form a removable cover clamped as by bolts 15 to the sides against an intervening gasket 16, comprises two sheets of glass, Lucite or other material transparent to solar radiation, separated by a spacer strip 17 and cemented or otherwise suitably held in place. The dead air space between the glass layers reduces convection and conduction losses with but negligible effect on transmission of incoming radiation.

The details of construction of a dehumidifier D1 suitable for inclusion in the system of Figure 1 is shown in Figure 4. The drying agent, preferably silica gel or Calcel (calcium hydrochlorosilicate) or, less desirably, activated alumina and the like, is spread on the screen bottoms of trays 18 slidably supported by the rails 19 suitably attached as by welding to the sides of the drying chamber 20 formed by the inner walls of the box-structure 21 and of the cover 22. The staggered position of the trays ensured by the stops 23 causes the air in its passage through the chamber to travel a long folded path over and under the several trays thus to afford maximum contact of the air and desiccant both in dehumidification of air and reactivation of desiccant.

The double-walled construction of the box 21 and cover 22 is to minimize convection and conduction losses.

The cover 22 which may be bolted in position against the box 21 and the intervening gasket 24 of rubber or equivalent resilient material may be provided with glass-covered peep-holes 25 for inspection of the desiccant without interruption of use of the system.

In the form of solar-heat trap H2 shown in Figures 5 and 6, the bottom and side walls are made of metal-bonded plywood, such as fibreglass board, welded or brazed to form an inner heating compartment separated from the ambient atmosphere by a dead air-space 14B and the outer wall structure. The top wall 8B of the compartment is formed by two spaced layers of glass, or other material herein named, suitably sealed to allow exhaustion of air from the coil compartment to a pressure of about one inch of mercury or less. The inner and outer faces of the bottom and side walls are coated with aluminum or white enamel.

The heater coil 2B and the fins 13B may, as in other forms of heater shown, be of copper, brass, bronze, aluminum having a dull black oxidized or painted surface.

The supports 26 of the heater coil 2B and bracing struts 11B may be of laminated fabric, plywood or other material of low thermal conductivity. Each of the binding wires 27 passes through one of the supports 26 over the adjacent part of the tube and has its ends twisted to hold the tube in place.

The lugs 28 from which pins 29 extend are fastened to the exterior of the box to facilitate mounting and adjustment of the heater in and to desired position.

Figure 7:
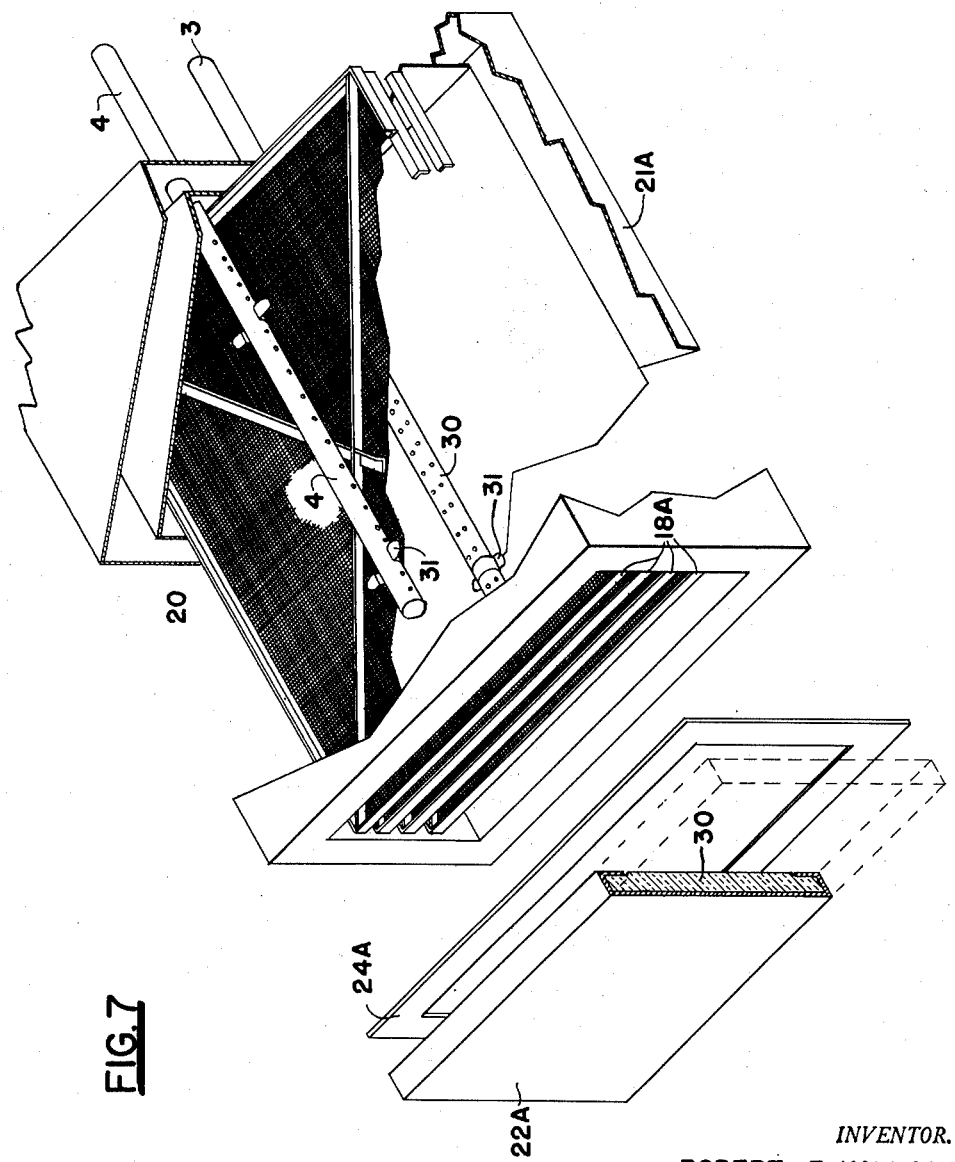
Figure 7 is an exploded isometric view with parts broken away of another form of desiccant container.

The form of dehumidifier shown in Figure 7 is in general similar to that above described and the same reference characters, with added identifying letter, are applied to corresponding parts. In this form, the cover 22A is of single wall construction having, however, an inturned edge for retaining a mat 30 of fibreglass or similar material which is compressed against the ends of trays 18A when the cover is bolted in position against the box 21A and the intervening gasket 24A which is preferably of butyl rubber.

The air-lines 3, 4 extend into the dehumidifying compartment and are suitably held as by brackets 31 against the top and bottom walls. Each line is preforated within the compartment to allow passage of air in the form of a multiplicity of streams well distributed over the cross-sectional area of the compartment.

While I have illustrated preferred constructions, it is to be understood my invention is not limited thereto but is coextensive in scope with the appended claims.

The invention described herein may be manufactured and used by or for the Government of the United States of America for governmental purposes without the payment of any royalties therefor.

What I claim is:

1. In combination in apparatus of the class described, adapted to be exposed to the sunlight and to ambient air; a storage compartment airtight except for a breather aperture; a breather line having one end connected to said breather aperture; a heating chamber airtight except for a first heater aperture and a second heater aperture; said heating chamber having a transparent cover for free transmission of solar radiation; means in said chamber for trapping heat from the sunlight; means connecting said first heater aperture to the other end of said breather line; said heating chamber adapted to heat only air as it passes through the breather line; a drier container spaced apart and separately housed from the heating chamber and airtight except for a first drier aperture and a second drier aperture; desiccant material in said container; and a conduit connecting said second heater aperture and said first drier aperture; said second drier aperture being in communication with said ambient air.

2. The combination of claim 1 wherein said heating chamber includes means for tilting the chamber thereby resetting the position of said chamber for optimum exposure to the sunlight.

ROBERT F. HALLOCK.

REFERENCES CITED

The following references are of record in the file of this patent:

UNITED STATES PATENTS

| Number | Name | Date |
|---|---|---|
| 117,476 | Sperry | July 25, 1871 |
| 409,359 | Johnson | Aug. 20, 1889 |
| 629,122 | Davis | July 18, 1899 |
| 748,696 | Browning | Jan. 5, 1904 |
| 965,391 | Little | July 26, 1910 |
| 1,759,971 | Austin | May 27, 1930 |
| 1,814,897 | Coxe | July 14, 1931 |
| 1,863,656 | Hartman | June 21, 1932 |
| 1,908,248 | Hull | May 9, 1933 |
| 2,122,821 | Mohr | July 5, 1938 |
| 2,314,657 | Morris | Mar. 23, 1943 |
| 2,462,952 | Dunkak | Mar. 1, 1949 |